United States Patent
Saito et al.

(10) Patent No.: US 9,168,593 B2
(45) Date of Patent: Oct. 27, 2015

(54) DRILL

(75) Inventors: Manabu Saito, Tokyo (JP); Tatsuo Nakahata, Tokyo (JP); Hideharu Takahashi, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 1651 days.

(21) Appl. No.: 12/654,610

(22) Filed: Dec. 24, 2009

(65) Prior Publication Data

US 2010/0166517 A1 Jul. 1, 2010

(30) Foreign Application Priority Data

Dec. 26, 2008 (JP) ................................. 2008-333380

(51) Int. Cl.
 *B23B 51/02* (2006.01)
 *B23B 51/00* (2006.01)

(52) U.S. Cl.
 CPC ................ *B23B 51/02* (2013.01); *B23B 51/00* (2013.01); *B23B 2226/27* (2013.01); *B23B 2226/275* (2013.01); *B23B 2251/04* (2013.01); *B23B 2251/082* (2013.01); *B23B 2251/14* (2013.01); *B23B 2265/16* (2013.01); *B23C 2220/56* (2013.01); *Y10T 408/9097* (2015.01)

(58) Field of Classification Search
 CPC .... B23B 51/02; B23B 51/00; B23B 2251/14; B23B 2251/082; B23B 2226/27; B23B 2251/18; B23B 2265/16
 USPC .......................... 408/230, 226, 227, 228, 229
 See application file for complete search history.

(56) References Cited

U.S. PATENT DOCUMENTS

| 1,309,706 A | 7/1919 | Taylor |
| 1,320,985 A | 11/1919 | Brightman |
| 2,084,737 A | 6/1937 | Magnus |
| 2,258,674 A | 10/1941 | Ceska |
| 3,443,459 A | 5/1969 | Mackey et al. |
| 4,132,493 A | 1/1979 | Hosoi |

(Continued)

FOREIGN PATENT DOCUMENTS

| DE | 299 19 858 U1 | 4/2000 |
| DE | 202 09 767 | 11/2003 |

(Continued)

OTHER PUBLICATIONS

U.S. Appl. No. 12/318,249, filed Dec. 23, 2008 (30 pages).

(Continued)

*Primary Examiner* — Eric A Gates
*Assistant Examiner* — Paul M Janeski
(74) *Attorney, Agent, or Firm* — Smith, Gambrell & Russell, LLP

(57) ABSTRACT

A drill includes a cutting edge having a ridgeline. The ridgeline has a part of an ellipse and a straight line. It is assumed that the coordinates of a separation point of an ellipse portion from a straight line portion are $(x_0, y_0)$. The straight line is a tangent to the ellipse at the separation point. It is assumed that a1 is an area from a tip end of the drill to $x_0$, a2 is an area from $x_0$ to the origin of the ellipse, and a3 is a negative area, along the x-axis. The ridgeline of the cutting edge is formed straight along the tangent in the area a1, and is formed along the ellipse in the area a2. A margin is formed in the area a3 continuously from a relief face of the cutting edge.

17 Claims, 13 Drawing Sheets

(56) References Cited

U.S. PATENT DOCUMENTS

| | | | |
|---|---|---|---|
| 4,411,563 A | 10/1983 | Moon | |
| 4,440,532 A | 4/1984 | D'Apuzzo | |
| 4,662,803 A | 5/1987 | Arnold | |
| 4,725,171 A | 2/1988 | DeTorre | |
| 4,932,815 A | 6/1990 | Krauss | |
| 4,936,721 A | 6/1990 | Meyer | |
| 5,141,369 A | 8/1992 | Palace | |
| 5,217,332 A | 6/1993 | Takasaki et al. | |
| 5,282,705 A | 2/1994 | Shiga et al. | |
| 5,486,075 A | 1/1996 | Nakamura et al. | |
| 5,558,475 A | 9/1996 | Hakansson et al. | |
| 5,636,948 A | 6/1997 | Rexius | |
| 5,725,338 A | 3/1998 | Cabaret et al. | |
| 6,916,139 B2 | 7/2005 | Yanagida et al. | |
| 6,929,434 B2 | 8/2005 | Prokop | |
| 7,665,935 B1 | 2/2010 | Garrick et al. | |
| 7,717,710 B2 | 5/2010 | Danger et al. | |
| 8,132,989 B2 | 3/2012 | Iguchi et al. | |
| 2003/0129031 A1 | 7/2003 | Mast et al. | |
| 2005/0135889 A1 | 6/2005 | Turrini et al. | |
| 2008/0193234 A1 | 8/2008 | Davancens et al. | |
| 2010/0158626 A1 | 6/2010 | Nakahata et al. | |
| 2010/0166517 A1 | 7/2010 | Saito et al. | |
| 2010/0232899 A1 | 9/2010 | Saito et al. | |
| 2011/0200403 A1 | 8/2011 | Gruber | |

FOREIGN PATENT DOCUMENTS

| | | |
|---|---|---|
| DE | 103 46 217 | 4/2005 |
| EP | 2 202 018 A1 | 6/2010 |
| JP | S57-127608 | 8/1982 |
| JP | 63-306812 | 12/1988 |
| JP | 2-237708 | 9/1990 |
| JP | 5-245711 | 9/1993 |
| JP | 6-75612 | 10/1994 |
| JP | 06-75612 U | 10/1994 |
| JP | 11-114712 A | 4/1999 |
| JP | 2602032 Y | 12/1999 |
| JP | 2002-036018 A | 2/2002 |
| JP | 2007-144526 A | 6/2007 |
| JP | 2008-36759 | 2/2008 |
| JP | 2009-039811 A | 2/2009 |
| SU | 1085702 | 4/1984 |
| WO | 97/31741 | 9/1997 |

OTHER PUBLICATIONS

European Search Report dated Mar. 2, 2010 for Application No. EP 09 18 0077.

European Search Report dated Feb. 15, 2011 for Application No. EP 10 19 2825.

Japanese Office Action dated May 14, 2013 for Japanese Application No. 2008-333380, with English translation.

Extended European Search Report dated Jun. 17, 2010 for Application No. EP 10 15 5199.

DRILL

CROSS-REFERENCES TO RELATED APPLICATIONS

The disclosure of Japanese Patent Application No. 2008-333380 filed on Dec. 26, 2008 including the specification, drawings and abstract is incorporated herein by reference in its entirety.

BACKGROUND OF THE INVENTION

1. Field of the Invention

The present invention relates to a drill including a cutting edge a point angle of which varies depending on a position.

2. Description of the Related Art

Examples of the drill including a cutting edge a point angle of which varies depending on a position may be double angle drills disclosed in Japanese Unexamined Patent Application Publication No. 1988-306812 (hereinafter, referred to as document '812) and in Japanese Unexamined Utility Model Application Publication No. 1994-75612 (hereinafter, referred to as document '612).

Such a double angle drill includes a primary cutting edge and a secondary cutting edge. The tip section of the primary cutting edge has a ridgeline shape of a drill for metal. The secondary cutting edge continuously extending from the primary cutting edge is flat and has a smaller point angle than the primary cutting edge.

Any of documents '812 and '612 teaches that the double angle drill is suitable for drilling a hole in a fiber reinforced plastic composite material and a metal material at a time.

With the double angle drill, the primary cutting edge drills a primary hole with a relatively small diameter, and then the secondary cutting edge cuts the outer periphery of the primary hole to drill a secondary hole with a target diameter. During drilling, transient delamination may appear at the periphery of the primary hole of the composite material. The delamination is removed by cutting the primary hole by the secondary cutting edge.

Unfortunately, as mentioned in document '612, the double angle drill typically has low wear resistance. Document '612 discloses a configuration to increase the wear resistance of the cutting edge by covering the cutting edge with a diamond film with a suitable film thickness.

However, the double angle drill has corners at the boundary between the primary and secondary cutting edges and at the outermost periphery of the secondary cutting edge. A stress is likely concentrated at the corners, and hence chipping likely appears at the corners. Thus, such a shape of the drill decreases the wear resistance of the drill.

In order to increase the wear resistance of the cutting edge, the applicant of this application has filed an application for a drill in Japanese Unexamined Patent Application Publication No. 2008-36759 (hereinafter, referred to as document '759). The drill includes a cutting edge. The cutting edge has a point angle which is continuously decreased from a center-position point angle A (herein, 0°<A<180°) at a center position to a maximum-diameter-position point angle of 0° at a maximum diameter position. The cutting edge has a relief angle which is continuously decreased from the center position to the maximum diameter position.

Document '759 describes the point angle of the cutting edge as follows. "The point angle of the cutting edge is decreased from the center-position point angle A to the maximum-diameter-position point angle of 0° in a continuously changing manner. Accordingly, the ridgeline of the cutting edge defines a smooth curve without a corner (point of discontinuity). Also, it is assumed that the curve defined by the ridgeline of the cutting edge is a curve protruding to the outside without a point of inflection. For example, in the ridgeline of the cutting edge, the curve from the center-position point angle A to the maximum-diameter-position point angle of 0° is defined as a part of a parabola. The ridgeline of the cutting edge may partly have a straight line. In this case, the point angle of the cutting edge is continuously changed even at a transition portion between the straight line and the curve (not having a straight line), thereby eliminating a corner." Also, document '759 describes that the ridgeline of the cutting edge may be an arcuate ridgeline formed of a single arc, instead of the parabolic ridgeline.

With the drill disclosed in document '759, the point angle of the cutting edge is continuously decreased from the center position to the maximum diameter position. Thus, the ridgeline of the cutting edge has no corner, which is likely chipped, and the wear resistance of the cutting edge is increased.

The drill disclosed in document '759 has a cutting edge section mainly for drilling, which is located close to the tip end among the entire cutting edge, and a cutting edge section mainly for reaming, which continuously extends from the former cutting edge and is located close to the rear end. The cutting edge mainly for drilling gradually shifts to the cutting edge mainly for reaming.

The present invention is made as a result of advanced studies on the drill of such a type disclosed in document '759 by the inventors of this application, for a fiber reinforced plastic composite material. The present invention provides a drill that is ideally suited for drilling a hole in the fiber reinforced plastic composite material.

A first object of the studies by the inventors of this application has been to increase reaming performance by a cutting edge section located close to the rear end.

A second object of the studies by the inventors of this application has been to increase cutting performance by a cutting edge section located close to the tip end.

SUMMARY OF THE INVENTION

In light of this, an object of the present invention is to allow a drill including a cutting edge a point angle of which varies depending on a position to have better reaming performance by a cutting edge section located close to the rear end among the entire cutting edge and better cutting performance by a cutting edge section located close to the tip end.

A drill according to a first aspect of the present invention includes a cutting edge having a ridgeline. The ridgeline is entirely or partly formed along a part of a reference ellipse.

A drill according to a second aspect of the present invention includes a cutting edge having a ridgeline. A portion of the ridgeline continuously extending to a maximum diameter position from a predetermined point located closer to a tip end of the drill than the maximum diameter position is formed along a part of a reference ellipse.

In the above-described configuration, a portion of the ridgeline continuously extending from the predetermined point toward the tip end of the drill may be formed straight along a tangent to the reference ellipse at the predetermined point.

A drill according to a third aspect of the present invention includes a cutting edge having a ridgeline. The ridgeline is entirely or partly formed along a reference curve that is defined by connecting end points of a plurality of arcs. Each of the arcs has end points on a reference ellipse. Also, a tangent to the arc is common to a tangent to the reference ellipse, or the arc has a common point with the reference ellipse at a position other than the end points.

A drill according to a fourth aspect of the present invention includes a cutting edge having a ridgeline. A portion of the ridgeline continuously extending to a maximum diameter position from a predetermined point located closer to a tip end of the drill than the maximum diameter position is formed along a reference curve that is defined by connecting end points of a plurality of arcs. Each of the arcs has end points on a reference ellipse. Also, a tangent to the arc is common to a tangent to the reference ellipse, or the arc has a common point with the reference ellipse at a position other than the end points.

In the above-described configuration, a portion of the ridgeline continuously extending from the predetermined point toward the tip end of the drill may be formed straight along a tangent to the reference curve at the predetermined point.

In the above-described configuration, the reference ellipse may be an ellipse having a minor axis located at the maximum diameter position.

In the above-described configuration, the cutting edge may have a constant relief angle in a predetermined area extending from a position closest to the tip end of the drill.

In the above-described configuration, the cutting edge may have a constant relief angle in an area closer to the tip end of the drill than the predetermined point.

In the above-described configuration, the cutting edge may have a relief angle $\delta 1$ at the position closest to the tip end of the drill and a relief angle $\delta 2$ at the maximum diameter position. The relief angles $\delta 1$ and $\delta 2$ may have a relationship $\delta 1 > \delta 2$. The relief angle $\delta 1$ may be gradually decreased to be the relief angle $\delta 2$ in at least a part of an area from the position closest to the tip end of the drill to the maximum diameter position.

In the above-described configuration, the cutting edge may have a relief angle $\delta 1$ at a position closest to the tip end of the drill and a relief angle $\delta 2$ at a maximum diameter position. The relief angles $\delta 1$ and $\delta 2$ may have a relationship $\delta 1 > \delta 2$. The relief angle $\delta 1$ may be gradually decreased to be the relief angle $\delta 2$ in an area from the predetermined point to the maximum diameter position.

In the above-described configuration, the drill may have a margin continuously extending from a relief face of the cutting edge toward a rear end of the drill. The margin may have the relief angle $\delta 2$.

With the drill according to the aspects of the present invention, the ridgeline of the cutting edge is formed along the ellipse. That is, with the aspects of the present invention, since the curve defined by expanding the ellipse is used, the point angle can be decreased toward the rear end of the drill, at which a cutting edge section mainly for reaming is provided. Also, with the aspects of the present invention, since the point angle is decreased toward the rear end, reaming can be sufficiently performed while cutting load is decreased at a position near the maximum diameter position close to the rear end. Reaming performance of the cutting edge section close to the rear end among the entire cutting edge can be increased. Thus, a fine cut surface can be obtained.

The ridgeline of the cutting edge may have the straight line portion near the tip end of the drill. In the straight line portion, the ridgeline is formed straight. When the straight line portion has a properly selected point angle, at the start of drilling, catching performance of the tip section of the drill to bite into a workpiece, centrality, holding stability, etc., are improved. The cutting performance of the tip section mainly for drilling is increased. A single drill can provide both good cutting performance by the cutting edge section located close to the tip end of the drill, and provide good reaming performance by the cutting edge section located close to the rear end.

Also, when the relief face is kept constant at the straight line portion, the holding stability is further increased.

Further, with the drill according to the third and fourth aspects of the present invention, the ridgeline of the cutting edge is formed without reference to the reference ellipse, but with reference to the plurality of connected arcs substantially extending along the reference ellipse. Thus, by shaping the drill by successively following the arcs, the drill, in which the ridgeline of the cutting edges is formed substantially along the ellipse, can be obtained. Therefore productivity can be increased.

DESCRIPTION OF THE PREFERRED EMBODIMENTS

Hereinafter, embodiments of the present invention are described with reference to the attached drawings. These embodiments are merely examples of the present invention, and hence the present invention should not be limited to these embodiments.

First, two examples of drills will be described, to which the shape of a drill of the present invention may be applied. One of the two drills is a drill having a helical flute (see FIGS. 1 to 3), and the other is a drill having a straight flute (see FIGS. 4 and 5).

Figure 1:
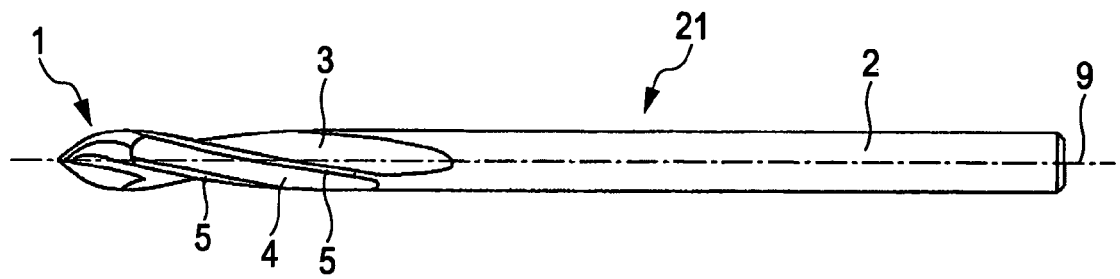
FIG. 1 is a side view showing a drill having helical flutes as an example to which the present invention can be applied.

FIG. 1 is a side view showing the drill having the helical flute.

Referring to FIG. 1, a drill 21 includes a cutter edge section 1 and a shank section 2. Helical flutes 3 are formed on the cutter edge section 1 and the shank section 2.

Figure 2:
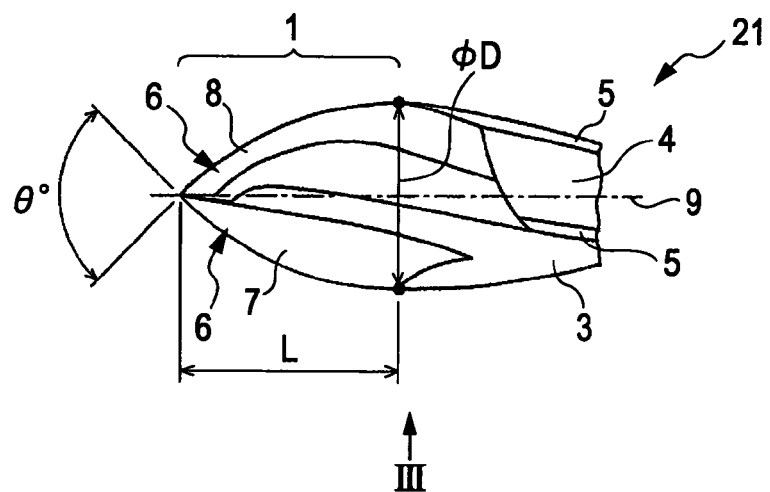
FIG. 2 is an enlarged view showing a tip section of the drill in FIG. 1.

FIG. 2 is an enlarged view showing a tip section of the drill 21 in FIG. 1.

The cutter edge section 1 includes a pair of cutting edges 6 arranged symmetrically about an axis 9. The cutting edges 6 each have a rake face 7 and a relief face 8.

The cutter edge section 1 is finished by X thinning (cross thinning), and rake faces 7 are formed at positions where portions of the cutter edge section 1 have been removed by thinning. The positions where the portions have been removed by thinning are continuous to the helical flutes 3. The helical flutes 3 are two threads which are twisted at a predetermined helix angle. Lands 4 are formed between the helical flutes 3. Margins 5 are formed at both edges of the lands 4 along the helical flutes 3. The margins 5 contact the inner surface of a hole being processed and supports the drill 21.

Referring to FIG. 2, the cutter edge section 1 has a maximum diameter $\phi D$ and a length L1. It is assumed that the point angle of each cutting edge 6 at a center position is $\theta$ (herein, $0°<\theta<180°$). The point angle of each cutting edge 6 at the position with the maximum diameter $\phi D$ is $0°$.

The point angle of the cutting edge 6 is decreased from the center-position point angle $\theta$ to the maximum-diameter-position point angle of $0°$ in a continuously changing manner. Accordingly, the ridgeline of the cutting edge 6 defines a smooth curve without a corner (point of discontinuity).

Figure 3:
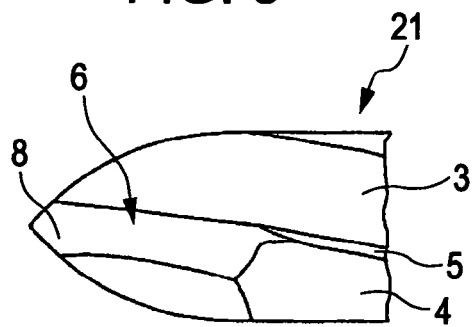
FIG. 3 is a side view showing the drill when seen in a direction indicated by arrow III in FIG. 2.

FIG. 3 is a side view showing the drill 21 when seen in a direction indicated by arrow III in FIG. 2. It is to be noted that the drill 21 has a three-dimensional shape axially symmetric about the axis 9. Thus, the drill 21 has the same side surface at any angle as a side surface $180°$ opposite thereto.

Figure 4:
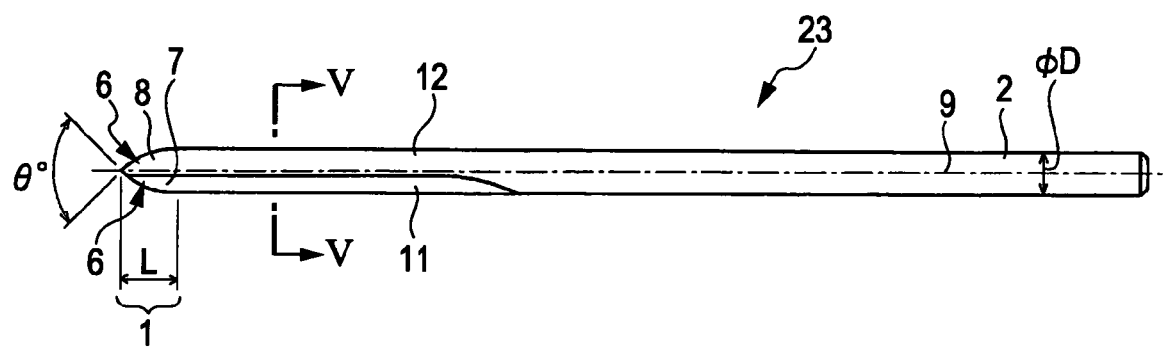
FIG. 4 is a side view showing a drill having straight flutes as an example to which the present invention can be applied.
Figure 5:
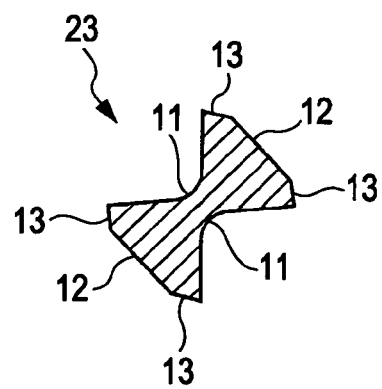
FIG. 5 is a cross-sectional view taken along line V-V in FIG. 4.

FIG. 4 is a side view showing the drill having the straight flute. FIG. 5 is a cross-sectional view taken along line V-V in FIG. 4. A drill 23 has a V-groove 11 instead of the helical flute 3 of the drill 21. Like numerals refer to like components.

Referring to FIGS. 4 and 5, two V-grooves 11 are formed on the cutter edge section 1 and the shank section 2 in the drill 23. The V-grooves 11, including a removed portion of the cutter edge section 1 by thinning, are formed straight along the axis 9.

Referring to FIG. 5, lands 12 are formed between the V-grooves 11, and margins 13 are formed at both edges of the lands 12 along the V-grooves 11. The margins 13 contact the inner surface of a hole being processed and supports the drill 23. The four margins 13 support the drill 23 at four points in any cross section. Holding by twisting is not provided, however, the drill 23 is stably held at the hole being processed or at the inner surface of a bushing guide, and hole processing with a reduced bend can be provided.

Figure 6:
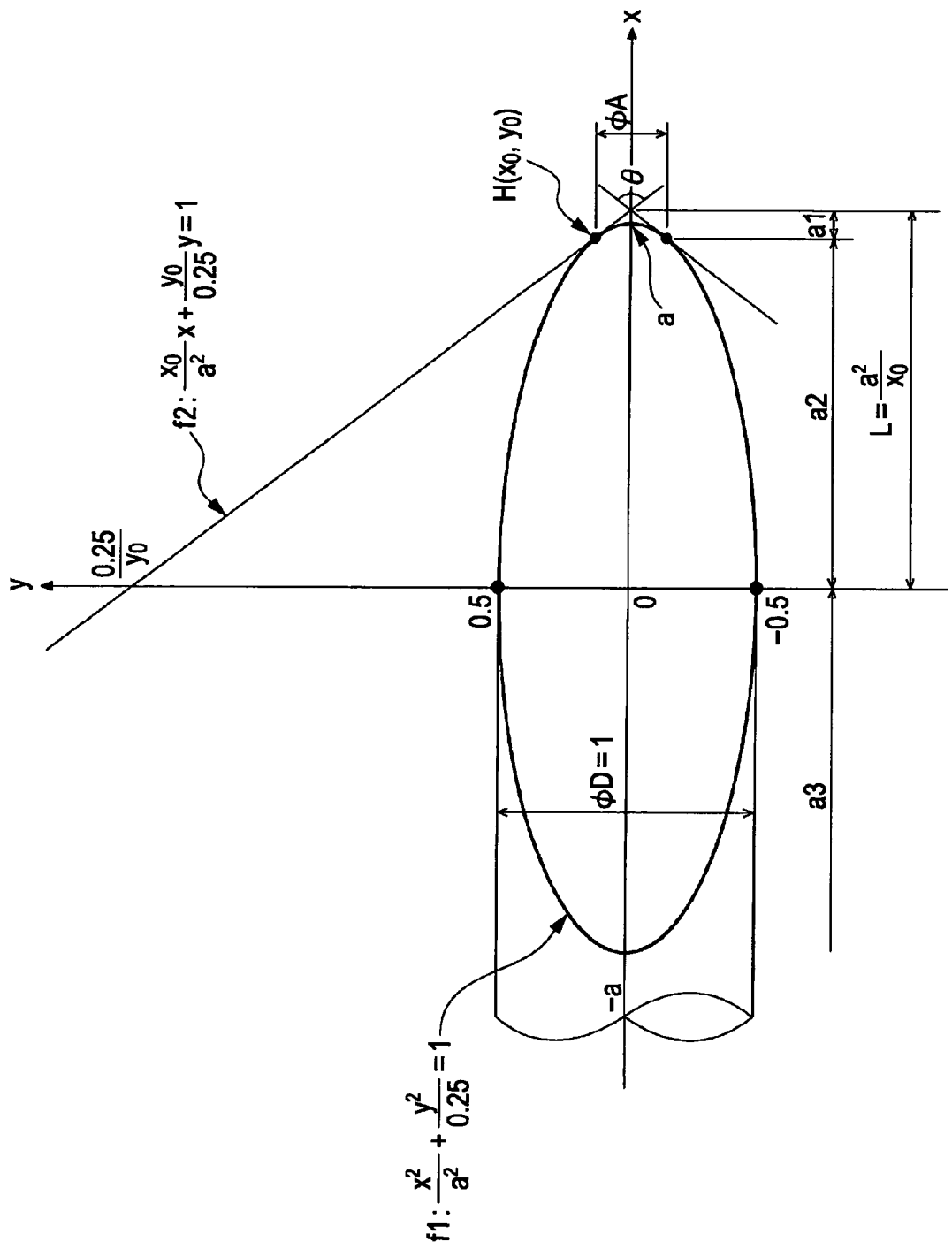
FIG. 6 is an outline side view showing a drill including a cutting edge having an ellipse portion and a straight line portion according to an embodiment of the present invention.

The shape of a drill according to an embodiment of the present invention will be described below. FIG. 6 is an outline side view showing a drill including a cutting edge having an ellipse portion and a straight line portion according to the embodiment of the present invention.

Here is described the shape of the drill. Since the size of the drill is not so important, the size of the drill is assumed to $\phi D=1$ as shown in FIG. 6. The x-y coordinates are assumed here, in which the x-axis corresponds to the axis of the drill, the positive direction of the x-axis corresponds to a direction toward the tip end of the drill, and the y-axis corresponds to an axis orthogonal to the x-axis and passing through the maximum diameter position of the drill. A reference ellipse f1 has a radius of 0.5 along the minor axis. The center of the reference ellipse f1 is located at the origin of the x-y coordinates. The minor axis of the reference ellipse f1 is aligned with the y-axis. Thus, the major axis of the reference ellipse f1 is aligned with the x-axis. The reference ellipse f1 may have any radius along the major axis. In this case, the radius along the major axis is "a."

Referring to FIG. 6, the ridgeline of a cutting edge of the drill has a part of an ellipse and a straight line. It is assumed that the coordinates of a separation point H of an ellipse portion from a straight line portion are $(x_0, y_0)$. The diameter of the drill at $x_0$, that is, the maximum diameter of the straight line portion may be desirably determined. In this case, the diameter is $\phi A$. Thus, $\phi A = 2 \times y_0$.

A straight line f2 is a tangent to the ellipse f1 at the separation point H. It is assumed that a1 is an area from the tip end of the drill to $x_0$, a2 is an area from $x_0$ to the origin, and a3 is a negative area, along the x-axis. The ridgeline of the cutting edge is formed straight along the tangent f2 in the area a1, and is formed along the reference ellipse f1 in the area a2. That is, the ridgeline of the cutting edge overlaps with the tangent f2 in the area a1 and overlaps with the reference ellipse f1 in the area a2. A margin is formed in the area a3 continuously from the relief face of the cutting edge.

A relational expression of θ, φA, and L may be derived below as Expression 1 under the conditions described above. The shape of the drill can be designed by using Expression 1.

$$\tan\left(\frac{\theta}{2}\right) = \frac{0.25}{y_0 \cdot L} = \frac{0.5}{\phi A \cdot L} \tag{1}$$

Figure 7:
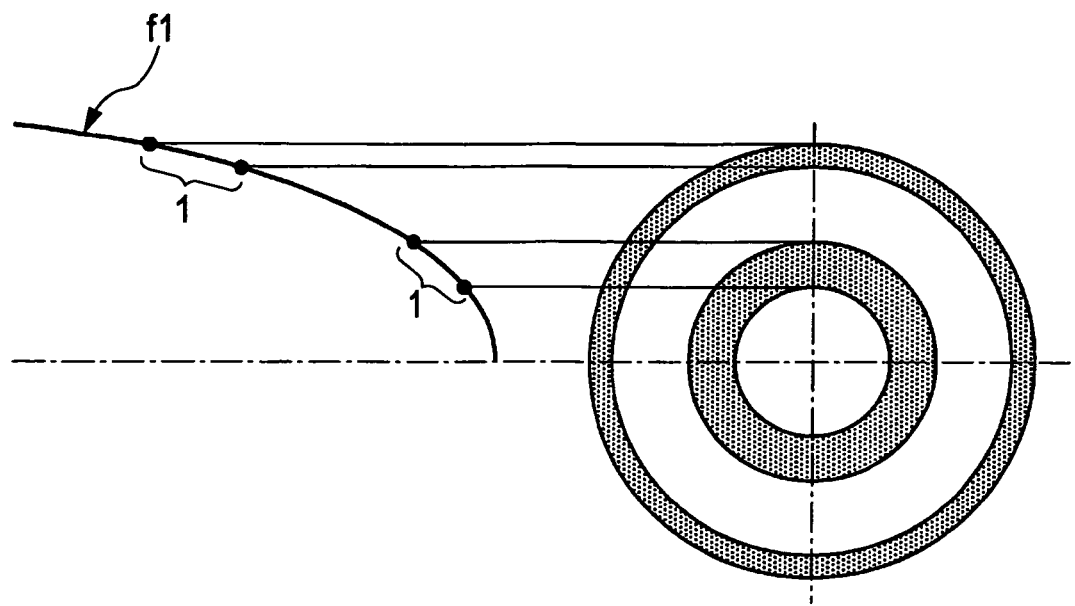
FIG. 7 is a schematic diagram for comparison between the cutting volume of a tip end portion of the cutting edge and the cutting volume of a rear end portion of the cutting edge of the drill according to the embodiment of the present invention.

Next, cutting performance of the ellipse portion of the cutting edge will be more specifically described with reference to FIGS. 7 and 8.

When the cutting edge has a constant point angle at any position, the cutting volume per unit length of the cutting edge is increased toward the rear end where the radius is large. In contrast, in the case of the drill shown in FIG. 7, the point angle of the cutting edge is decreased toward the rear end along the ellipse. Hence, the increase in cutting volume per unit length of the cutting edge can be prevented or reduced so that the cutting volume can be constant from the tip end to the rear end. When the ellipse f1 serves as the reference, the cutting volume per unit length of the cutting edge can be more decreased toward the rear end by a certain value or larger. Thus, the progress state of wear can be uniform over the cutting edge. To achieve the uniform progress state of wear, it has to be taken into account that the cutting speed may vary depending on the position of the cutting edge. In particular, the cutting speed, i.e., the peripheral speed of the cutting edge is increased from the tip end toward the rear end of the drill. Owing to this, the rear end is more likely subjected to wear. Hence, by decreasing the cutting volume per unit length of the cutting edge toward the rear end, the cutting load can be uniform at any position of the cutting edge, and the progress state of wear becomes also uniform. Since the progress state of wear is uniform, when the cutting edge is re-grinded after use, the entire cutting edge can be sharpened by a small re-grinded amount. The re-grinding work can be facilitated.

Figure 8:
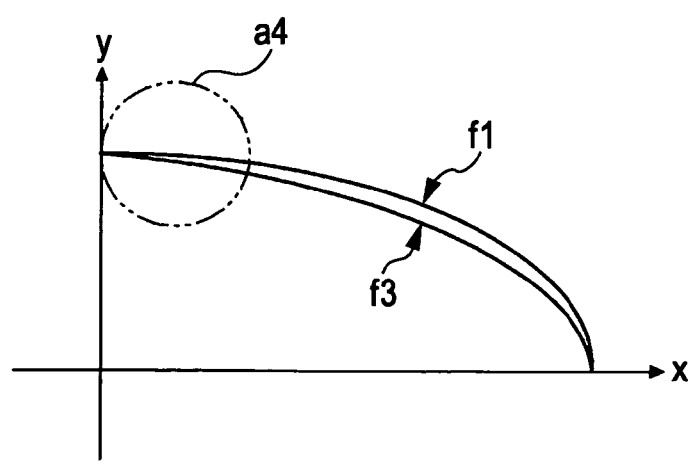
FIG. 8 is an illustration for comparison between an ellipse (according to the embodiment of the present invention) and a parabola, either of which is the reference for the ridgeline of cutting edge of the drill.

Referring to FIG. 8, when the ellipse f1 serves as the reference, the point angle of the cutting edge becomes zero at the maximum diameter position (x=0). In contrast, when a parabola f3 serves as the reference, the point angle does not become zero. In the case of the ellipse f1 as compared with the case of the parabola f3, the point angle of the cutting edge in an area a4 close to the maximum diameter position becomes small, and the point angle can be further decreased toward the rear end. Thus, the cutting load in the area a4 near the maximum diameter position located close to the rear end can be substantially decreased, and reaming can be sufficiently performed. Reaming performance of a cutting edge section located close to the rear end among the entire cutting edge can be increased.

Further, when the ellipse f1 serves as the reference, the life of the drill can become long because the point angle is zero at the maximum diameter position (x=0) and hence no corner, which is likely subjected to wear, is produced.

Figure 9:
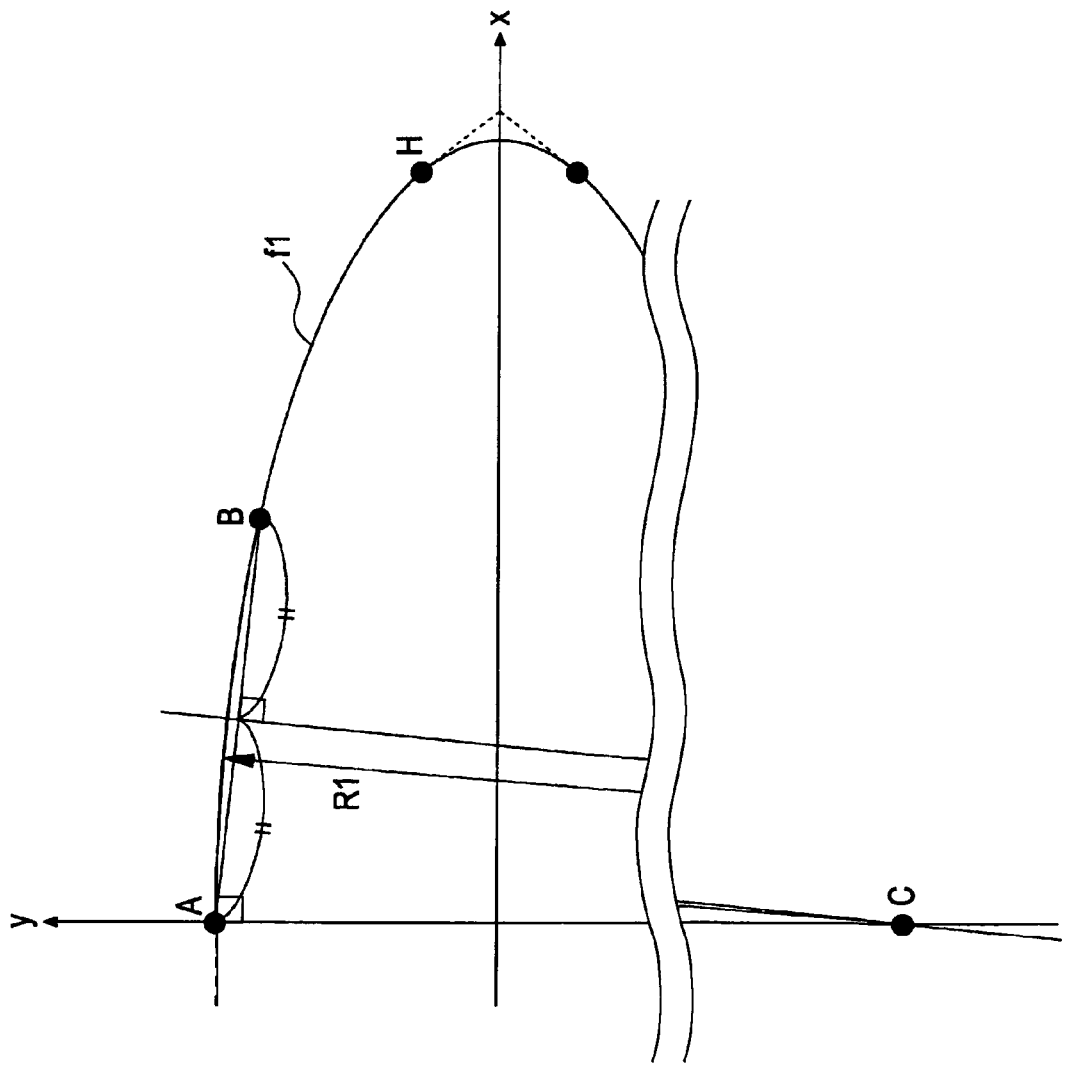
FIG. 9 is an illustration (at the rear end portion) showing a method of plotting a reference curve that is defined by connecting end points of a plurality of arcs, on the basis of a reference ellipse f1 in FIG. 6.
Figure 10:
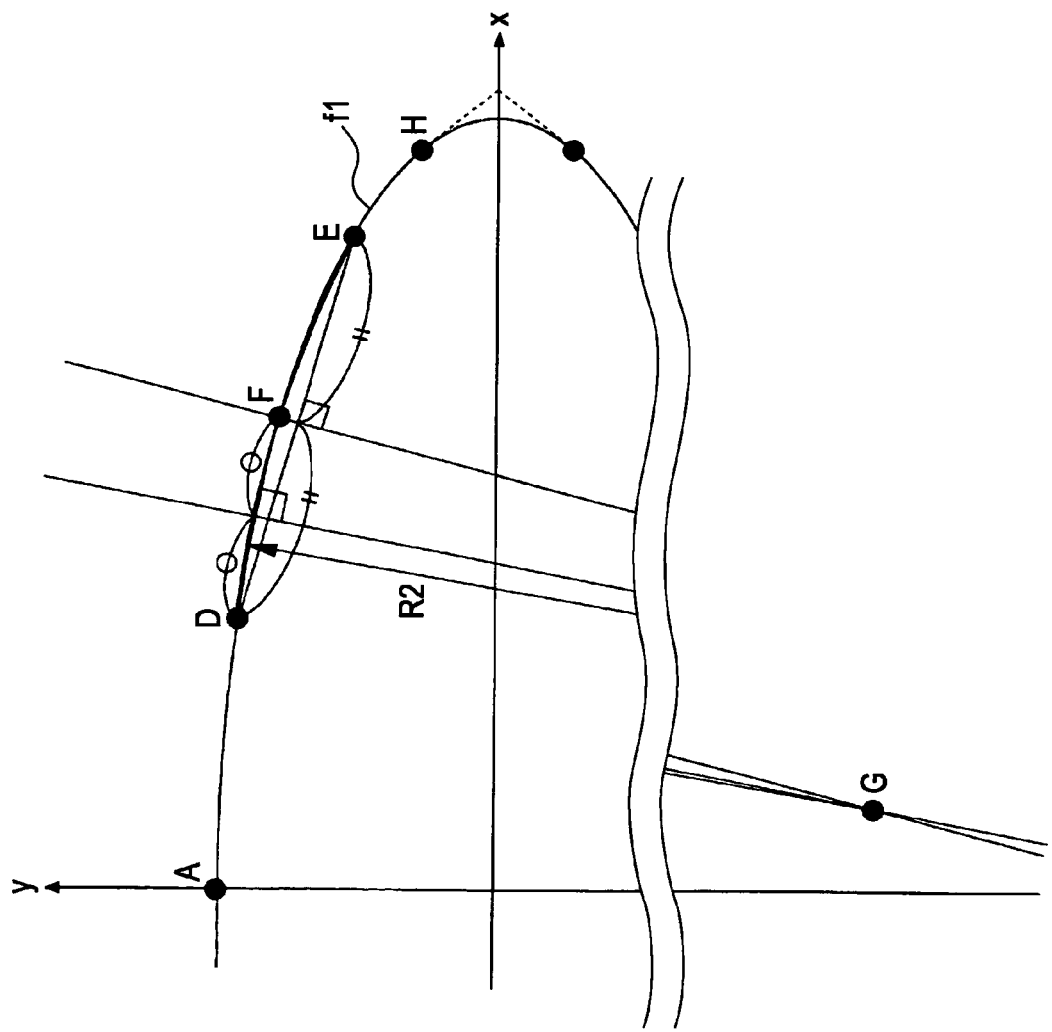
FIG. 10 is an illustration (at the middle portion) showing a method of plotting the reference curve that is defined by connecting the end points of the plurality of arcs, on the basis of the reference ellipse f1 in FIG. 6.
Figure 11:
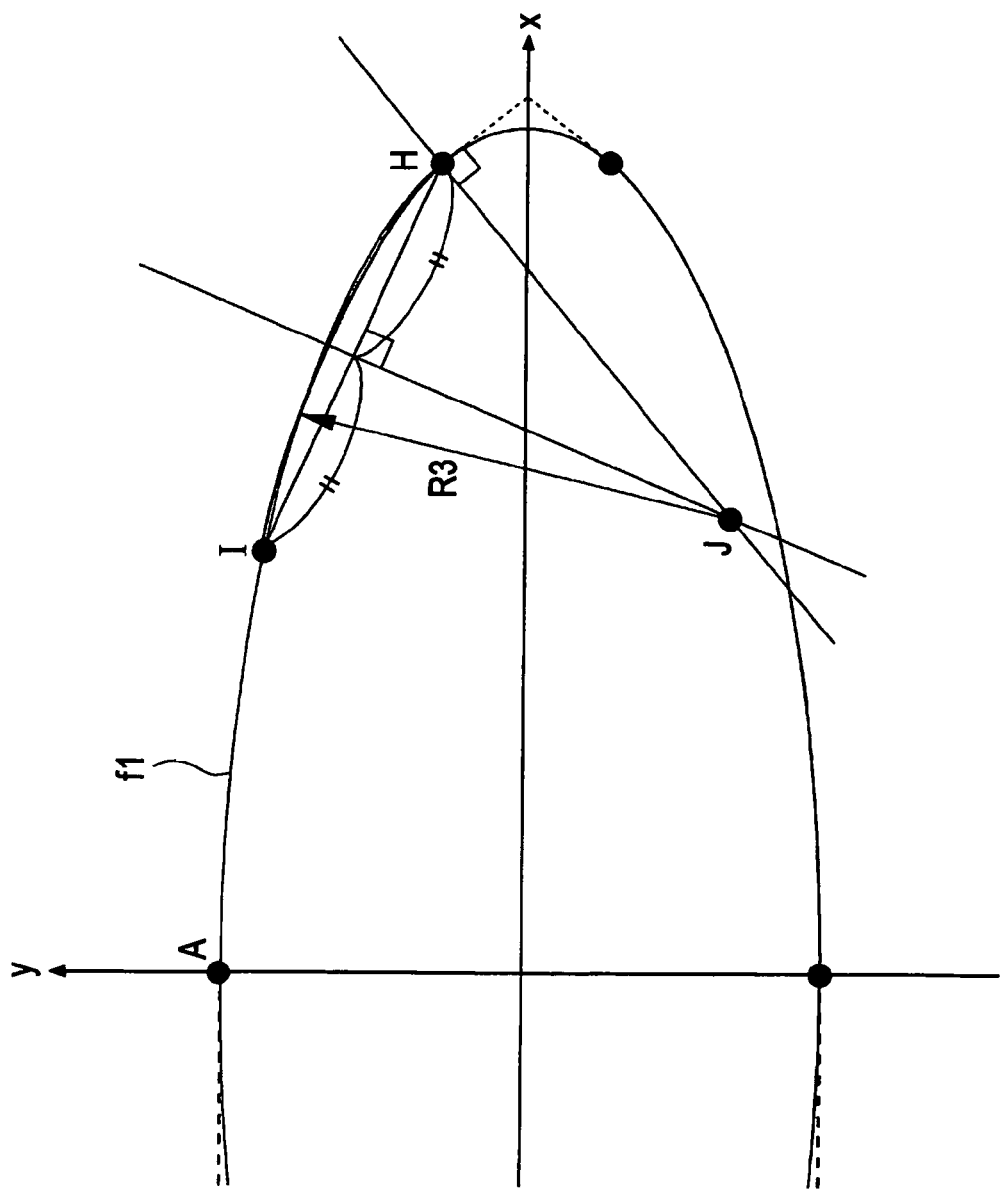
FIG. 11 is an illustration (at the tip end portion) showing a method of plotting the reference curve that is defined by connecting the end points of the plurality of arcs, on the basis of the reference ellipse f1 in FIG. 6.

Next, a method of determining a reference curve will be described. The reference curve is defined by connecting end points of a plurality of arcs. FIGS. 9 to 11 are illustrations each showing a method of plotting a reference curve based on the reference ellipse f1 shown in FIG. 6.

An arc having an end point at the maximum diameter position is determined as follows.

Referring to FIG. 9, an arc AB serves as an arc included in the reference curve. The arc AB has one end point at a point A of the maximum diameter position on the reference ellipse f1, and the other end point at a desirable point B between the point A and the separation point H. The center of the arc AB is at the intersection C of the perpendicular bisector of a segment AB with the y-axis. The arc AB has a radius (R1) corresponding to a line segment AC (=line segment BC). A tangent to the arc AB at the point A is a straight line passing through the point A and being parallel to the x-axis. The straight line is also a tangent to the reference ellipse f1 at the point A.

A desirable arc, an end point of which is not at the point A or the separation point H, but at a position between the point A and the separation point H, is determined as follows.

Referring to FIG. 10, an arc DE serves as an arc included in the reference curve. The arc DE has one end point at a desirable point D on the reference ellipse f1, and the other end point at a desirable point E between the point D and the separation point H. Assuming that the point D is the same point as the point B (see FIG. 9), the arc DE is continuously arranged from the arc AB. Assuming that the intersection of the perpendicular bisector of a line segment DE with the reference ellipse f1 is a point F, the center of the arc DE is at the intersection G of the perpendicular bisector of the line segment DE with the perpendicular bisector of a line segment DF. The arc DE has a radius (R2) corresponding to a line segment DG (=line segment FG=line segment EG). The point F is a common point of the arc DE with the reference ellipse f1.

The arc, an end point of which is not at the point A or the separation point H, but at a position between the point A and the separation point H, has been provided in the above description. However, such an arc may not be provided. If the arc is provided, a desirable number of arcs may be provided.

An arc having an end point at the separation point H is determined as follows.

Referring to FIG. 11, an arc HI serves as an arc included in the reference curve. The arc HI has one end point at the separation point H, and the other end point at a desirable point I between the point A on the reference ellipse f1 and the separation point H. Herein, it is assumed that the end point of the arc DE closest to the tip end of the drill, the point which has been determined by the method shown in FIG. 10, serves as the point I. The center of the arc HI is at the intersection J of the perpendicular bisector of a line segment HI with a normal of the reference ellipse f1 passing through the separation point H. The arc HI has a radius (R3) corresponding to a line segment HJ (=line segment IJ). A tangent to the arc HI at the separation point H is also a tangent to the reference ellipse f1 at the separation point H.

The ridgeline of the cutting edge is formed along the reference curve, which has been determined as described above. That is, the ridgeline of the cutting edge overlaps with the reference curve. Referring to FIGS. 9 to 11, the radius of each arc is decreased toward the tip end of the drill. Each arc may have a desirable length; however, the length is preferably smaller toward the tip end of the drill to be aligned with the reference ellipse f1 as much as possible. This property is preferable because the major axis of the reference ellipse f1 is arranged along the axis of the drill, and the curvature of the reference ellipse f1 is increased toward the tip end of the drill.

Figure 12:
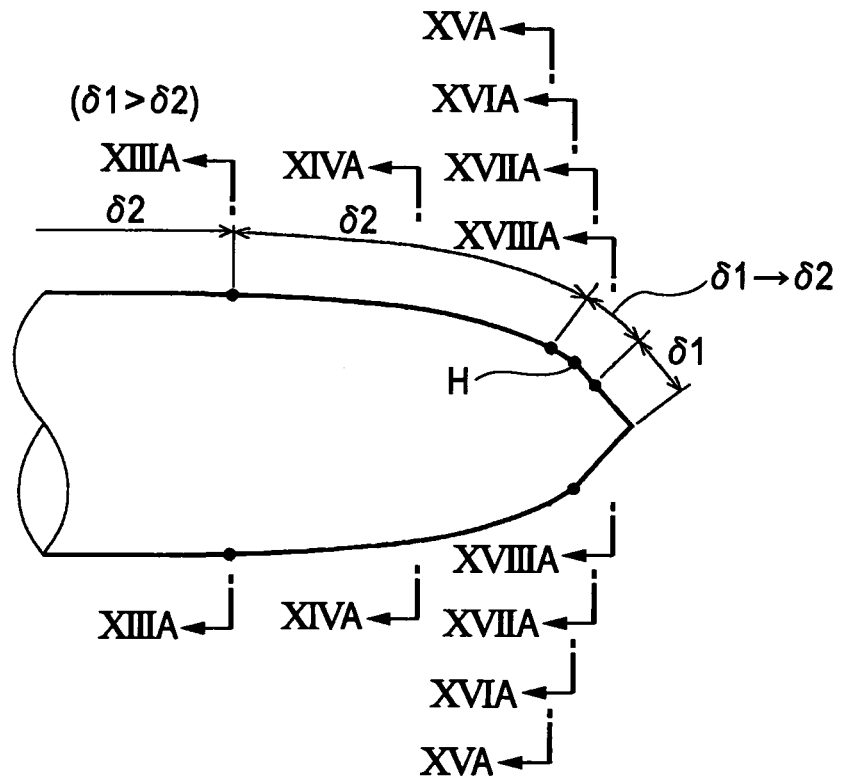
FIG. 12 is an outline side view showing a drill including a cutting edge having an ellipse portion and a straight line portion according to an embodiment of the present invention.
Figure 13A:
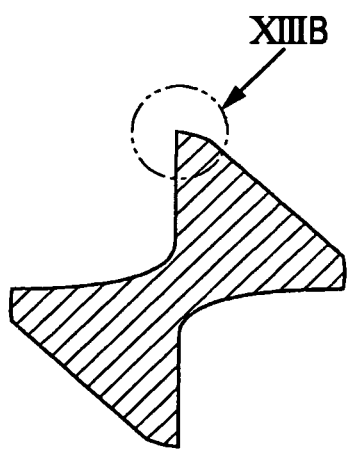
FIG. 13A is a cross-sectional view taken along line XIIIA-XIIIA in FIG. 12.
Figure 13B:
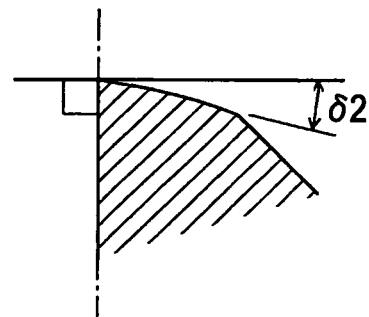
FIG. 13B is a detail view of part XIIIB in FIG. 13A.
Figure 14A:
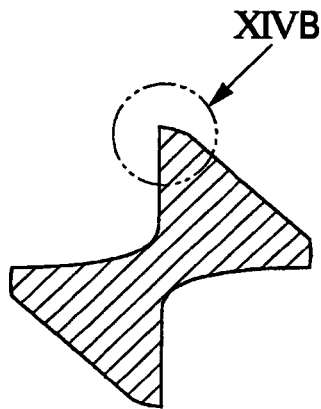
FIG. 14A is a cross-sectional view taken along line XIVA-XIVA in FIG. 12.
Figure 14B:
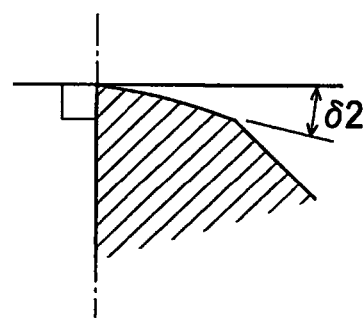
FIG. 14B is a detail view of part XIVB in FIG. 14A.
Figure 15A:
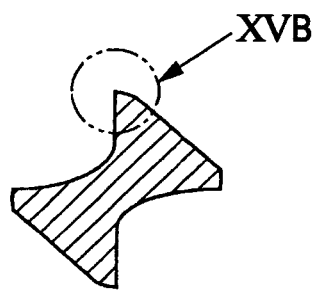
FIG. 15A is a cross-sectional view taken along line XVA-XVA in FIG. 12.
Figure 15B:
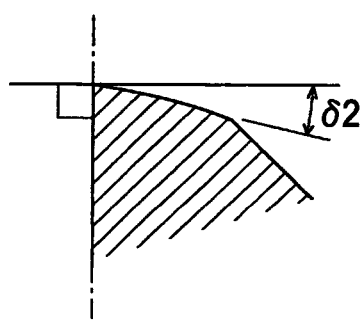
FIG. 15B is a detail view of part XVB in FIG. 15A.
Figure 16A:
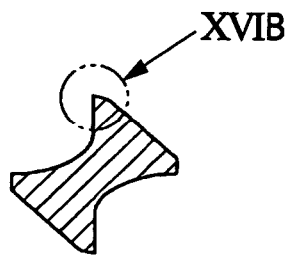
FIG. 16A is a cross-sectional view taken along line XVIA-XVIA in FIG. 12.
Figure 16B:
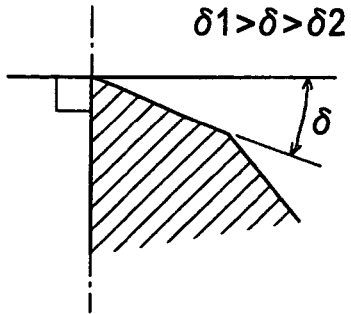
FIG. 16B is a detail view of part XVIB in FIG. 16A.
Figure 17A:
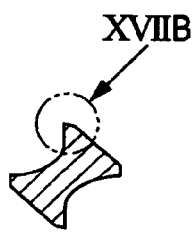
FIG. 17A is a cross-sectional view taken along line XVIIA-XVIIA in FIG. 12.
Figure 17B:
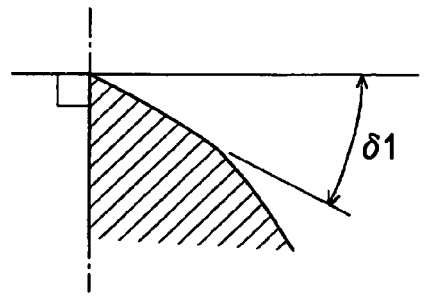
FIG. 17B is a detail view of part XVIIB in FIG. 17A.
Figure 18A:
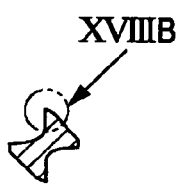
FIG. 18A is a cross-sectional view taken along line XVIIIA-XVIIIA in FIG. 12.
Figure 18B:
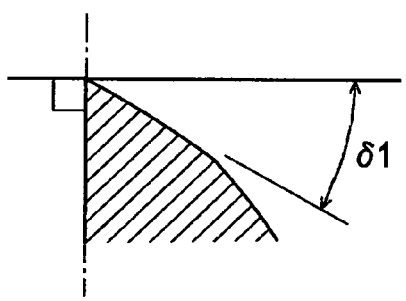
FIG. 18B is a detail view of part XVIIIB in FIG. 18A.

Next, a relief angle of a cutting edge and a margin will be described. FIG. 12 is an outline side view showing a drill including a cutting edge having an ellipse portion and a straight line portion according to an embodiment of the present invention. The point angle of the cutting edge corresponds to that shown in FIG. 6. FIG. 12 shows the positions of cross sections XIIIA-XIIIA, XIVA-XIVA, XVA-XVA, XVIA-XVIA, XVIIA-XVIIA, and XVIIIA-XVIIIA. Cross-sectional views at these positions are respectively shown in FIGS. 13A, 14A, 15A, 16A, 17A, and 18A. Enlarged views of the cutting edge in the cross sections are shown in FIGS. 13B, 14B, 15B, 16B, 17B, and 18B.

In the drill shown in FIGS. 12 through 18B, the cutting edge has a constant relief angle in an area from the tip end of the drill to cross section XVIIA-XVIIA. The relief angle is determined as δ1. δ1 may range from 40° to 50°. In an area from cross section XVIIA-XVIIA to cross section XVA-XVA, the relief angle of the cutting edge of the drill is gradually decreased from δ1 (in cross section XVIIA-XVIIA) to δ2 (in cross section XVA-XVA). The relief angle of the cutting edge and the margin closer to the rear end of the drill than cross section XVA-XVA is δ2, which is constant. δ2 may range from 5° to 15°.

Figure 19:
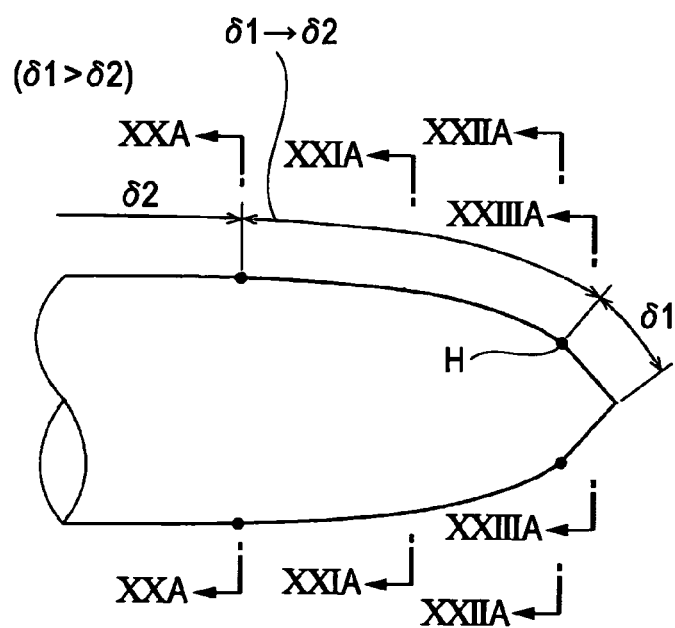
FIG. 19 is an outline side view showing a drill including a cutting edge having an ellipse portion and a straight line portion according to an embodiment of the present invention.
Figure 20A:
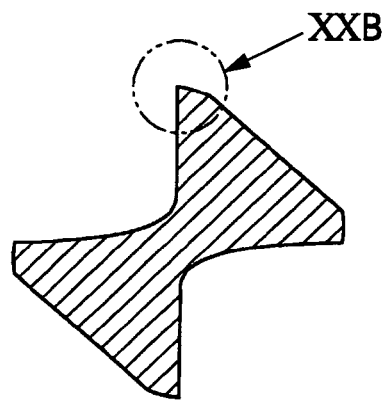
FIG. 20A is a cross-sectional view taken along line XXA-XXA in FIG. 19.
Figure 20B:
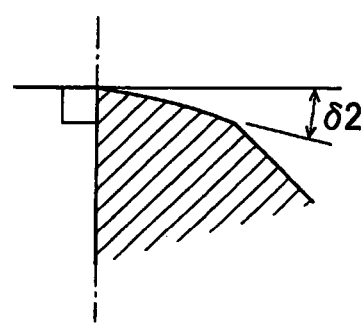
FIG. 20B is a detail view of part XXB in FIG. 20A.
Figure 21A:
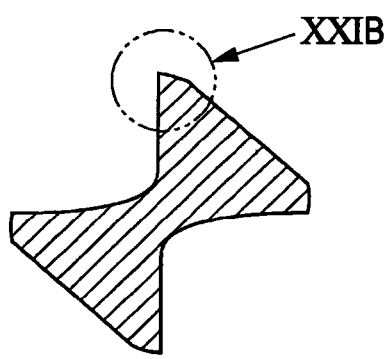
FIG. 21A is a cross-sectional view taken along line XXIA-XXIA in FIG. 19.
Figure 21B:
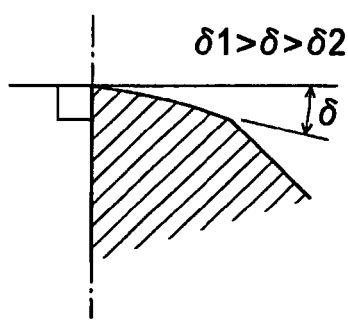
FIG. 21B is a detail view of part XXIB in FIG. 21A.
Figure 22A:
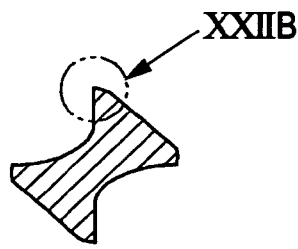
FIG. 22A is a cross-sectional view taken along line XXIIA-XXIIA in FIG. 19.
Figure 22B:
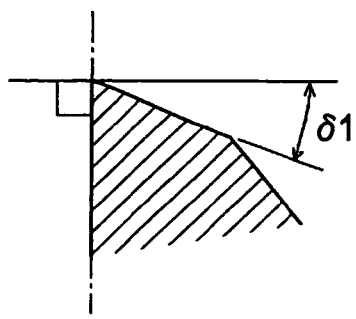
FIG. 22B is a detail view of part XXIIB in FIG. 22A.
Figure 23A:
FIG. 23A is a cross-sectional view taken along line XXIIIA-XXIIIA in FIG. 19.
Figure 23B:
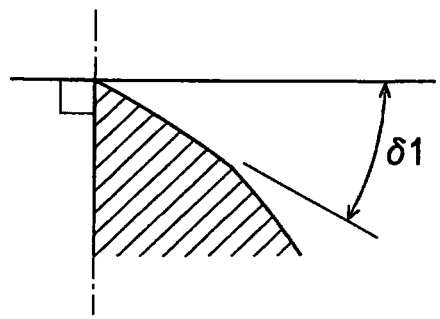
FIG. 23B is a detail view of part XXIIIB in FIG. 23A.

Next, a relief angle of a cutting edge and a margin will be described according to another embodiment. FIG. 19 is an outline side view showing a drill including a cutting edge having an ellipse portion and a straight line portion according to the embodiment of the present invention. The point angle of the cutting edge corresponds to that shown in FIG. 6. FIG. 19 shows the positions of cross sections XXA-XXA, XXIA-XXIA, XXIIA-XXIIA, and XXIIIA-XXIIIA. Cross-sectional views at these positions are respectively shown in FIGS. 20A, 21A, 22A, and 23A. Enlarged views of the cutting edge in the cross sections are shown in FIGS. 20B, 21B, 22B, and 23B.

In the drill shown in FIGS. 19 through 23B, the cutting edge has a constant relief angle in an area from the tip end of the drill to cross section XXIIA-XXIIA (the position of the separation point H). The relief angle is determined as δ1. δ1 may range from 40° to 50°. In an area from cross section XXIIA-XXIIA to cross section XXA-XXA, the relief angle of the cutting edge of the drill is gradually decreased from δ1 (in cross section XXIIA-XXIIA) to δ2 (in cross section XXA-XXA). The relief angle of the margin closer to the rear end of the drill than cross section XXA-XXA is δ2, which is constant. δ2 may range from 5° to 15°.

Referring to FIGS. 12 through 23B, the relief angle δ1 of the cutting edge section mainly for drilling located close to the tip end of the drill is relatively large, whereas the relief angle δ2 of the cutting edge section mainly for reaming located close to the rear end of the drill is relatively small. Thus, drilling can be more effectively performed at the tip end side and reaming can be more effectively performed at the rear end side. Also, by gradually decreasing the relief angle from δ1 to δ2 through the transition area, the entirely smooth cutting edge can be provided.

When the drill (former drill) shown in FIGS. 12 through 18B is compared with the drill (latter drill) shown in FIGS. 19 through 23B, the characteristics are different as follows.

(1) Regarding the cutting edge section mainly for drilling located closer to the tip end of the drill than the separation point H, the relatively large relief angle δ1 of the former drill has a small area, and hence the cutting resistance is large. In contrast, the relief angle δ1 of the latter drill has a large area, and hence the cutting resistance is small. (2) The change in relief angle of the latter drill from δ1 to δ2 is a slight change as compared with that of the former drill. Hence, the cutting edge is highly resistant to uneven wear, the hole quality, i.e., the quality of a produced hole is hard to be degraded, and the life of the drill tends to be long. (3) Regarding the cutting edge section mainly for reaming located closer to the rear end than the separation point H, the former drill has the relatively small relief angle δ2 in the substantially entire area, and hence the cutting resistance is large. In contrast, the latter drill has the relief angle in the transition area from δ1 to δ2. The average relief angle of the latter drill is large, and hence the cutting resistance is small.

Using the above-mentioned differences in the characteristics as the guidelines, the distribution of the relief angles can be designed in accordance with the desired characteristics.

Figure 24:
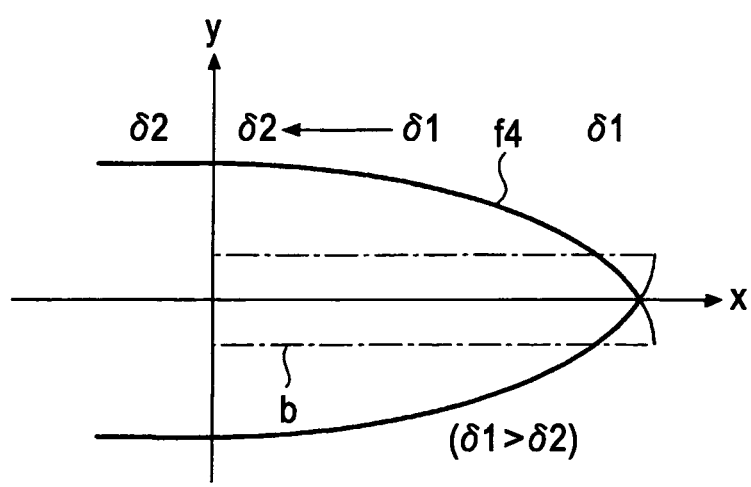
FIG. 24 is an outline side view of a drill including a cutting edge, which entirely extends along a part of an ellipse as a whole, according to an embodiment of the present invention.

Next, another embodiment of the point angle will be described. FIG. 24 is an outline side view of a drill including a cutting edge, which extends along a part of an ellipse as a whole, according to an embodiment of the present invention.

In the drill shown in FIG. 6, the ridgeline of the cutting edge of the drill has a part of an ellipse and a straight line. In contrast, the cutting edge of the drill shown in FIG. 24 does not have a straight line part, and the entire ridgeline of a cutting edge of the drill is a part of a reference ellipse f4. That is, the entire ridgeline of the cutting edge overlaps with the reference ellipse f4.

As described above, when the tip section of the cutting edge is formed along the reference ellipse f4, the major axis b of the ellipse f4 is shifted beyond the axis of the drill (x-axis) as shown in FIG. 24. If the shift amount is determined, the point angle at the center position can be determined. When the shift amount is zero, the point angle at the center position is 180°.

The point at which the minor axis of the reference ellipse f4 is coincided with the y-axis is the same as that of the drill shown in FIG. 6. The relief angle at the position closest to the tip end of the drill is preferably the relief angle δ1, and the relief angle at the maximum diameter position is preferably the relief angle δ2. The relationship δ1>δ2 is preferable. Also, the relief angle is preferably gradually decreased from δ1 to δ2 in at least a part of an area from the position closest to the tip end of the drill to the maximum diameter position.

Figure 25:
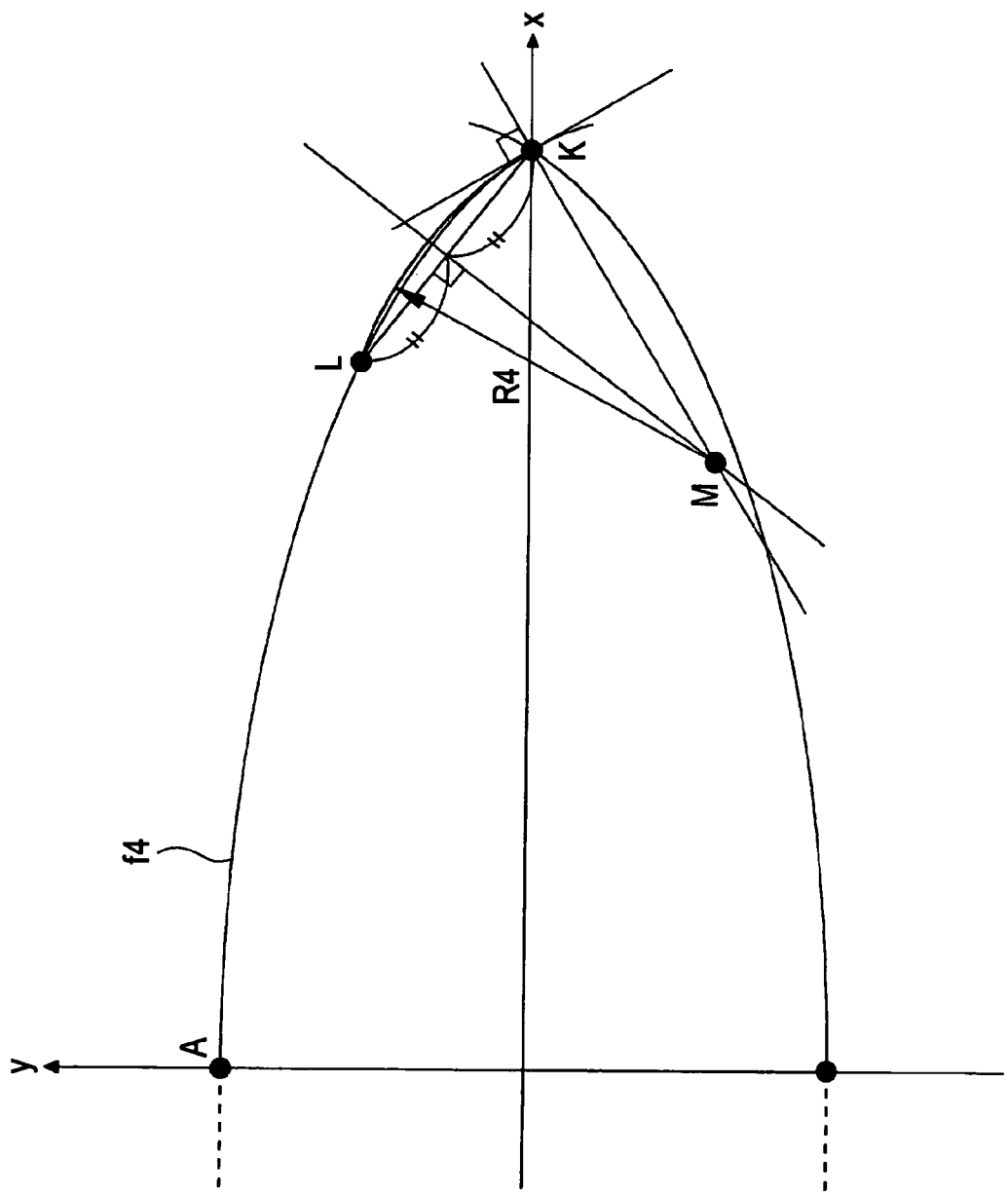
FIG. 25 is an illustration (at the tip end portion) showing a method of plotting a reference curve that is defined by connecting end points of a plurality of arcs, on the basis of a reference ellipse f4 in FIG. 24.

For the ridgeline of the cutting edge of the drill which is entirely defined by a part of the reference ellipse f4, a method of determining a reference curve that is defined by connecting end points of a plurality of arcs will be described. FIG. 25 is an illustration showing a method of plotting a reference curve based on the reference ellipse f4 shown in FIG. 24.

An arc having an end point at the maximum diameter position is determined in a similar manner to the method described above with reference to FIG. 9. An arc, an end point of which is not at the point A or the drill tip K, but at a position between the point A and the drill tip K is determined in a similar manner to the method described above with reference to FIG. 10.

An arc having an end point at the drill tip K is determined as follows.

Referring to FIG. 25, an arc KL serves as an arc included in the reference curve. The arc KL has one end point at the drill tip K, and the other end point at a desirable point L between the point A on the reference ellipse f4 and the drill tip K. Herein, it is assumed that the end point of the arc closest to the tip end of the drill, the end point which has been determined by the method shown in FIG. 10, serves as the point L. The center of the arc KL is at the intersection M of the perpendicular bisector of a line segment KL with a normal of the reference ellipse f4 passing through the point K (the drill tip K). The arc KL has a radius (R4) corresponding to a line segment KM (=line segment LM). A tangent to the arc KL at the point K is also a tangent to the reference ellipse f4 at the point K.

As a result, the ridgeline of the cutting edge is formed along the reference curve, which has been determined as described above. The ridgeline of the cutting edge overlaps with the reference curve.

In any of the drill shown in FIG. 6 and the drill shown in FIG. 24, a cutter edge may remain at the tip section of the drill. In this case, the above-described shape of the drill according to the embodiment of the present invention is applied to an area from the rear end of the drill to the cutter edge.

Next, a method of determined $\phi D$, L, $\theta$, and $\phi A$, which are suitable for drilling a hole in a fiber reinforced plastic composite material, will be described. Here, carbon fiber reinforced plastics (CFRP) will be used as an example of the fiber reinforced plastic composite material. Table 1 shows changes in characteristics in accordance with the value of L relative to the value of $\phi D$, i.e., L/$\phi D$.

TABLE 1

| L/$\phi$D | Cutting edge length | Required stroke | Drilling reaction force, cutting resistance | Hole quality (delamination, inner surface roughness of hole) | Life of drill | Comprehensive evaluation |
|---|---|---|---|---|---|---|
| 1.0 | Short | Short | Small | Not good | Short | Insufficient |
| 1.2 | ↑ | ↑ | ↑ | ↑ | ↑ | Fair |
| 1.4 | \| | \| | \| | \| | \| | Good |
| 1.5 | \| | \| | \| | \| | \| | Good |
| 1.6 | \| | \| | \| | \| | \| | Good |
| 1.8 | ↓ | ↓ | ↓ | ↓ | ↓ | Fair |
| 2.0 | Long | Long | Large | Good | Long | Insufficient |

When L/$\phi$D is increased as shown in Table 1, the length of the cutting edge is increased, and the distance of a stroke required for drilling is increased. Also, since drilling reaction force and cutting resistance are proportional to the length of the cutting edge, the drilling reaction force and cutting resistance are increased. Further, when the length of the cutting edge is increased, the cutting volume per unit length of the cutting edge is decreased and hence the cutting edge is hard to wear. Thus, hole quality, i.e., the quality of a produced hole (the level of delamination, inner surface roughness of the hole) is improved, and the life of the drill becomes long. The most right column of Table 1 shows the comprehensive evaluations of the characteristics for the CFRP when the value of L/$\phi$D ranges from 1.0 to 2.0. As shown in the comprehensive evaluations, good results can be obtained when the value of L/$\phi$D is in a range from 1.4 to 1.6, particularly around 1.5.

Regarding the results, the value is determined as L/$\phi$D=1.5. Table 2 shows values of $\phi$A/$\phi$D and changes in characteristics in accordance with the value of $\theta$ when L/$\phi$D=1.5.

TABLE 2

| $\theta$[°] | $\phi$A/$\phi$D | Centrality (deflection of tip end, holdability) | Drilling reaction force, cutting resistance | Hole quality (delamination, inner surface roughness of hole) | Durability of tip section against chipping | Comprehensive evaluation |
|---|---|---|---|---|---|---|
| 60 | 0.577 | Good | Small | Not good | Not good | Insufficient |
| 90 | 0.333 | ↑ | ↑ | ↑ | ↑ | Fair |
| 100 | 0.280 | \| | \| | \| | \| | Good |
| 120 | 0.192 | \| | \| | \| | \| | Good |
| 140 | 0.121 | \| | \| | \| | \| | Good |
| 150 | 0.089 | ↓ | ↓ | ↓ | ↓ | Fair |
| 180 | 0.000 | Not good | Large | Good | Good | Insufficient |

As shown in Table 2, the values of $\theta$ are in a range from 60° to 180°. The values of $\phi$A/$\phi$D respectively corresponding to the values of $\theta$ are obtained from Expression 1 and the expression L/$\phi$D=1.5, as shown in Table 2. When the value of $\theta$ is decreased from 180° to 60°, centrality (deflection state of the tip end, holdability) is good. This is because the tip end of the drill becomes sharper and deflection of the tip end less occurs as the value of $\theta$ is decreased. Also, the drilling reaction force and cutting resistance are decreased. This is because the cutting edge bites into a member to be cut by a larger distance as the radio of $\phi$A to $\phi$D is increased. Also, since the length of the cutting edge section mainly for reaming located closer to the rear end than the separation point H is increased as the value of $\phi$A/$\phi$D is decreased, the hole quality, i.e., the quality of a produced hole (the generated state of delamination, inner surface roughness of the hole) are improved. Also, since the tip end of the drill becomes sharper and hence the tip end is more likely to be chipped as the value of $\theta$ is decreased, the durability of the tip section of the drill against chipping is decreased.

The most right column of Table 2 shows the comprehensive evaluations of the characteristics for the CFRP when the value of $\theta$ ranges from 60° to 180°. As shown in the comprehensive evaluations, good results can be obtained when the value of $\theta$ is in a range from 100° to 140°.

With the results, a drill for drilling a hole in the CFRP preferably has a value of L/$\phi$D in the range from 1.4 to 1.6, and a value of $\theta$ in the range from 100° to 140°.

What is claimed is:

1. A drill comprising:
    a cutter edge section comprising a cutting edge having a ridgeline, a maximum diameter position, and a predetermined point located closer to a tip end of the drill than the maximum diameter position,
    wherein at least a part of the ridgeline is formed along a part of a reference ellipse, with a portion of the ridgeline continuously extending from the predetermined point toward the tip end of the drill formed straight along a tangent to the reference ellipse at the predetermined point,
    wherein the cutting edge has a relief angle $\delta 1$ at a position closest to the tip end of the drill and a relief angle $\delta 2$ at the maximum diameter position, the relief angles $\delta 1$ and $\delta 2$ having a relationship $\delta 1 > \delta 2$, wherein, in at least a part of an area from the position closest to the tip end of the drill to the maximum diameter position, the relief angle gradually decreases from the relief angle δ1 to the relief angle δ2, wherein the cutter edge section comprises a length L from the maximum diameter position to the tip end of the drill and a maximum diameter ΦD at the maximum diameter position, with the length L and the maximum diameter ΦD satisfying a ratio L/ΦD from 1.4 to 1.6, and wherein a point angle of the drill is in a range from 100° to 140°.

2. The drill according to claim 1, wherein the part of the ridgeline continuously extends to the maximum diameter position from the predetermined point located closer to the tip end of the drill than the maximum diameter position.

3. The drill according to claim 2, wherein the reference ellipse is an ellipse having a minor axis located at the maximum diameter position.

4. The drill according to claim 2, wherein the cutting edge has a constant relief angle in a predetermined area extending from a position closest to the tip end of the drill.

5. The drill according to claim 2, wherein the cutting edge has a constant relief angle in an area closer to the tip end of the drill than the predetermined point.

6. The drill according to claim 1, wherein, in an area from the predetermined point to the maximum diameter position, the relief angle gradually decreases from the relief angle δ1 to the relief angle δ2.

7. The drill according to claim 1, wherein the drill has a margin continuously extending from a relief face of the cutting edge toward a rear end of the drill, wherein the margin has the relief angle δ2.

8. The drill according to claim 1, wherein the cutter edge section comprises a diameter ΦA at the predetermined point, and the maximum diameter ΦD and the diameter ΦA satisfy a ratio ΦA/ΦD from 0.333 to 0.089.

9. A drill comprising:
a cutter edge section comprising a cutting edge having a ridgeline, a maximum diameter position, and a predetermined point located closer to a tip end of the drill than the maximum diameter position, wherein at least a part of the ridgeline is formed along a reference curve that is defined by connecting end points of a plurality of arcs, each of the arcs having end points on a reference ellipse, with a portion of the ridgeline continuously extending from the predetermined point toward the tip end of the drill formed straight along a tangent to the reference curve at the predetermined point, wherein the cutting edge has a relief angle δ1 at a position closest to the tip end of the drill and a relief angle δ2 at the maximum diameter position, the relief angles δ1 and δ2 having a relationship δ1>δ2, wherein, in at least a part of an area from the position closest to the tip end of the drill to the maximum diameter position, the relief angle gradually decreases from the relief angle δ1 to the relief angle δ2, wherein the cutter edge section comprises a length L from the maximum diameter position to the tip end of the drill and a maximum diameter ΦD at the maximum diameter position, with the length L and the maximum diameter ΦD satisfying a ratio L/ΦD from 1.4 to 1.6, and wherein a point angle of the drill is in a range from 100° to 140°.

10. The drill according to claim 9, wherein a tangent to at least one arc in the plurality of arcs is common to a tangent to the reference ellipse.

11. The drill according to claim 9, wherein at least one arc in the plurality of arcs has a common point with the reference ellipse at a position other than the end points.

12. The drill according to claim 9, wherein the part of the ridgeline continuously extends to the maximum diameter position from the predetermined point located closer to the tip end of the drill than the maximum diameter position.

13. The drill according to claim 12, wherein the reference ellipse is an ellipse having a minor axis located at the maximum diameter position.

14. The drill according to claim 12, wherein the cutting edge has a constant relief angle in a predetermined area extending from a position closest to the tip end of the drill.

15. The drill according to claim 12, wherein the cutting edge has a constant relief angle in an area closer to the tip end of the drill than the predetermined point.

16. The drill according to claim 9, wherein, in an area from the predetermined point to the maximum diameter position, the relief angle gradually decreases from the relief angle δ1 to the relief angle δ2.

17. The drill according to claim 9, wherein the drill has a margin continuously extending from a relief face of the cutting edge toward a rear end of the drill,
wherein the margin has the relief angle δ2.

* * * * *